(12) United States Patent
Tidestav et al.

(10) Patent No.: US 12,156,142 B2
(45) Date of Patent: Nov. 26, 2024

(54) POWER CONTROL REPORTING IN A WIRELESS COMMUNICATION SYSTEM

(71) Applicant: TELEFONAKTIEBOLAGET LM ERICSSON (PUBL), Stockholm (SE)

(72) Inventors: Claes Tidestav, Bålsta (SE); Niklas Wernersson, Kungsängen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 551 days.

(21) Appl. No.: 17/421,743

(22) PCT Filed: Jan. 10, 2020

(86) PCT No.: PCT/IB2020/050185
§ 371 (c)(1),
(2) Date: Jul. 9, 2021

(87) PCT Pub. No.: WO2020/144641
PCT Pub. Date: Jul. 16, 2020

(65) Prior Publication Data
US 2022/0104137 A1    Mar. 31, 2022

Related U.S. Application Data

(60) Provisional application No. 62/791,249, filed on Jan. 11, 2019.

(51) Int. Cl.
*H04B 7/185*    (2006.01)
*H04W 52/14*    (2009.01)
(Continued)

(52) U.S. Cl.
CPC ....... *H04W 52/146* (2013.01); *H04W 52/365* (2013.01); *H04W 52/367* (2013.01); *H04W 72/23* (2023.01)

(58) Field of Classification Search
CPC ............ H04W 52/146; H04W 52/365; H04W 52/367; H04W 72/23
(Continued)

(56) References Cited

U.S. PATENT DOCUMENTS

| 2010/0120446 A1* | 5/2010 | Gaal | H04W 72/542 |
| | | | 455/452.2 |
| 2011/0080838 A1* | 4/2011 | Larsson | H04W 52/367 |
| | | | 370/252 |

(Continued)

OTHER PUBLICATIONS

ZTE: "Parallel transmission of two types PHR", 3GPP Draft; R2-103725 Parallel Transmission of Typei 2 PHR, 3rd Generation Partnership Project (3GPP), Mobile Competence Centre; 650, Route Des Lucioles ; F-06921 Sophia-Antipolis Cedex ; France, vol. RAN WG2, No. Stockholm, Sweden; Jun. 28, 2010, Jun. 22, 2010 (Jun. 22, 2010), XP050451200, [retrieved on Jun. 22, 2010] the whole document.

(Continued)

*Primary Examiner* — Temica M Beamer
(74) *Attorney, Agent, or Firm* — Sage Patent Group

(57) ABSTRACT

Methods and apparatus for communicating power information to a base station (160) from a wireless device (110) having multiple transmission entities. An example method performed by the base station comprises receiving (310) a plurality of indications of power reporting parameters from the wireless device, each of the power reporting parameters corresponding to a respective uplink transmission entity (UTE) of the wireless device. The power reporting parameters corresponding to respective UTEs include power headroom values and/or maximum carrier power values.

22 Claims, 14 Drawing Sheets

Fig. 2A

Transmit the first and second indications of power reporting parameters to the base station, each of the power reporting parameters corresponding to a respective uplink transmission entity (UTE) of the wireless device
214

Receive control information that is dependent on at least one of the power reporting parameters.
216

(51) Int. Cl.
*H04W 52/36* (2009.01)
*H04W 72/23* (2023.01)

(58) Field of Classification Search
USPC .......................................................... 370/318
See application file for complete search history.

(56) References Cited

U.S. PATENT DOCUMENTS

| | | | | |
|---|---|---|---|---|
| 2011/0085483 | A1* | 4/2011 | Yeon .................... | H04W 72/21 370/329 |
| 2015/0087296 | A1* | 3/2015 | Kim ..................... | H04W 52/04 455/422.1 |
| 2019/0045459 | A1* | 2/2019 | Niu ..................... | H04W 52/365 |
| 2019/0141640 | A1* | 5/2019 | Abedini ............. | H04W 52/146 |
| 2021/0204229 | A1* | 7/2021 | Miao ................... | H04W 52/242 |

OTHER PUBLICATIONS

"Extended PHR considering beam and TRxP change", 3GPP Draft; R2-1713776 Extended PHR Considering Beam and TRXP Change, 3rd Generation Partnership Project (3GPP), Reno, USA; Dec. 17, 2017 Nov. 2017 (Nov. 17, 2017), XP051372433,Retrieved from the Internet:URL:http://www.3gpp.org/ftp/tsg%5Fran/WG2%5FRL2/TSGR2%5F100/Docs/ [retrieved on Nov. 17, 2017].
Nokia et al: "Enhancements on Multi-beam Operation", 3GPP Draft; RI-1813490, 3rd Generation Partnership Project (3GPP), Spokane, USA; Nov. 12, 2018-Nov. 16, 2018 Nov. 11, 2018 (Nov. 11, 2018), XP051555546, Retrieved from the Internet: URL:http://www.3gpp.org/ftp/Meetings%5F3GPP%5FSYNC/RAN1/Docs/R1%2D1813490%2Ezip [retrieved on Nov. 11, 2018].

* cited by examiner

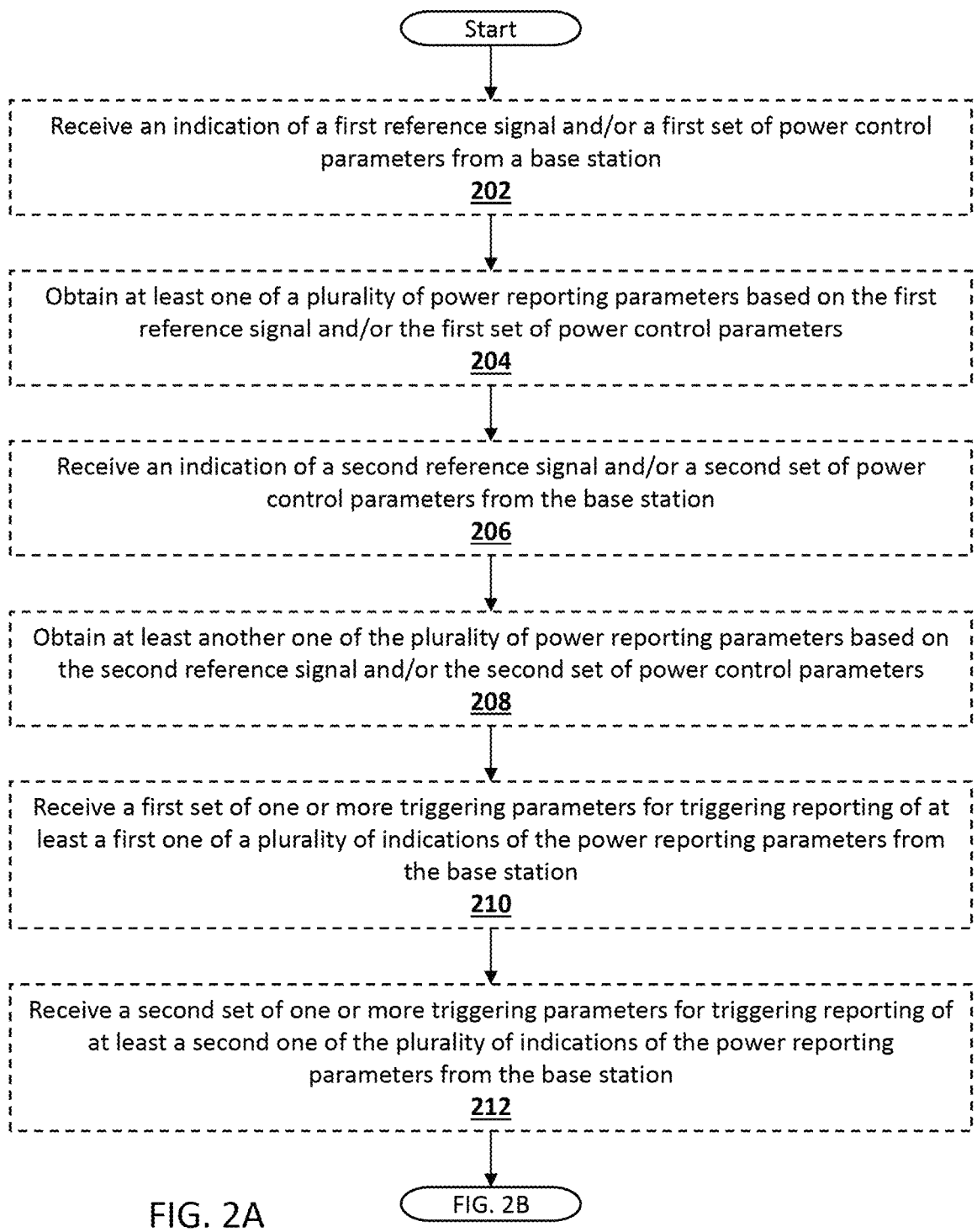

POWER CONTROL REPORTING IN A WIRELESS COMMUNICATION SYSTEM

This application is a 371 of International Application No. PCT/IB2020/050185, filed on Jan. 10, 2020, which claims priority to U.S. Patent Application No. 62/791,249, filed on Jan. 11, 2019, the contents of which are hereby incorporated by reference in their entirety.

TECHNICAL FIELD

The disclosed subject matter relates generally to telecommunications and more particularly to reporting power control parameters in a wireless device with multiple uplink transmission entities operable for use in a wireless communication system.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

A. Overview of Power Control Mechanisms

Setting output power levels of transmitters, e.g., base stations in downlink and mobile stations in uplink, in wireless communication systems is commonly referred to as power control (PC). Objectives of PC include improved capacity, coverage, improved system robustness, and reduced power consumption.

In LTE systems, PC mechanisms can be categorized in to the following groups: (i) open-loop, (ii) closed-loop, and (iii) combined open- and closed loop. These PC mechanisms differ in what input is used to determine the transmit power. In the open-loop case, the transmitter measures some signal sent from the receiver, and sets its output power based on this. In the closed-loop case, the receiver measures the signal from the transmitter, and based on this sends a Transmit Power Control (TPC) command to the transmitter, which then sets its transmit power accordingly. In a combined open- and closed-loop scheme, both inputs are used to set the transmit power.

B. PUSCH Power Control in NR

In NR systems, the UE determines the transmit power of the physical uplink shared channel (PUSCH) in accordance with 3GPP TS 38.213 v15.3.0, as follows:

$$P_{PUSCH} = \text{Min}(P_{CMAX}, P_0(j) + \alpha(j) \cdot PL(q) + 10 \log_{10}(2^\mu \cdot M_{RB}) + \Delta_{TF} + \delta(l)) \quad (1)$$

where, $P_{CMAX}$ is the configured UE transmit power defined in 3GPP TS 38.101 v15.3.0, $P_0(j)$ is a network-configurable parameter, which can be interpreted as a target received power, $\alpha(j)$ is a network-configurable parameter, which describes to what extent the power control compensates for the pathloss, $PL(q)$ is an estimate of the uplink pathloss, $\mu$ is related to the subcarrier spacing $\Delta f$ used for the PUSCH transmission: $\Delta f = 15 \text{ kHz} \cdot 2^\mu$, $M_{RB}$ is the number of resource blocks assigned for the PUSCH transmission, $\Delta_{TF}$ is an adjustment related to the utilized modulation and coding used for the PUSCH transmission, $\delta(l)$ is the closed-loop adjustment.

In NR systems, beam-based power control has also been introduced to take beam forming into account during the power control. This provides a generalization to the basic power control procedure in three ways:

1. The UE may perform several pathloss estimation processes
2. The UE may be configured with several sets of open-loop power control parameter sets
3. The UE may be configured with two closed-loop power control loops.

For every scheduling assignment, the NW may provide an indication for each of the above three bullets to steer the UL power control.

C. Power Headroom Reporting

Both in LTE and in NR systems, a UE may report the power headroom to the network (NVV). The power headroom report (PHR) provides the NW with information about how much transmit power is available at the UE. The NW may use this information when scheduling the UE or for other purposes, e.g., for collecting statistical/historical data, or the like. An illustration of the concept of power headroom is given in FIG. 13.

Essentially, the UE determines the power headroom as $$PH = P_{CMAX} - (P_0(f) + \alpha(j) \cdot PL(q) + 10 \log_{10}(2^\mu \cdot M_{RB}) + \Delta_{TF} + \delta(l)) \quad (2)$$

when there is an actual PUSCH transmission. All the parameters in equation (2) are defined in the sub-section above entitled, PUSCH power control in NR.

When there is no PUSCH transmission, the UE determines the power headroom for a hypothetical PUSCH transmission with a minimum allocation:

$$PH = \tilde{P}_{CMAX} - (P_0(j) + \alpha(j) \cdot PL(q) + \delta(l)) \quad (3)$$

In equation (3) above, $\tilde{P}_{CMAX}$ is computed from $P_{CMAX}$ and the relevant Tx power back-offs as described in 3GPP TS 38.101 v15.3.0.

A power headroom report may be triggered by one or both of the following mechanisms:

periodically by a configurable timer, and/or due to change in the power headroom by a configurable amount. This is typically caused by a change in pathloss.

D. Multi-Panel Wireless Devices

At high frequency, it is likely that the UEs will be equipped with several antenna panels. From each such antenna panel, the UE may form a number of beams. It is unlikely that the transmit power may be shared between panels: each antenna panel may have its own power amplifier, potentially with different maximum output power. The UE may also be adapted or configured to apply different maximum power reduction for the different panels, to ensure compliance with applicable electromagnetic energy absorption requirements in case proximity detection is used to address such requirements, which typically require a lower maximum output power.

In NR release 15, the NW may schedule transmission over any of the antenna panels the UE is equipped with. The NW may base its scheduling decision on previously received Sounding Reference Signals (SRS), where different SRS resources may have been transmitted from different panels. By measuring the received power for each of these SRS resources, the NW can determine which SRS was transmitted over the most favorable channel conditions. In subsequent scheduling assignments, the NW may instruct the UE to transmit the PUSCH using the same beam/precoder as was used to transmit the indicated SRS.

Although the NW can determine the channel conditions for each beam on each panel, the NW does not know the achievable UL performance for each beam on each panel since the maximum transmit power may be different for the different beams on the different panels. By only basing the scheduling decision on the channel conditions, there may be a performance loss.

SUMMARY

Certain aspects of the present disclosure and their embodiments may provide solutions to the issues described above or other challenges. Particular embodiments introduce the possibility for the wireless device to report multiple power reporting parameters, such as power headroom values, where each power reporting parameter corresponds to a particular one of a plurality of uplink transmission entities (UTEs). A UTE may be one or more antenna ports or an antenna panel, a power amplifier, or a combination of antenna panel and power amplifier. The network then uses the multiple power reporting parameters to perform scheduling. With accurate knowledge of the available transmit power for each beam on each panel, the NW can perform better scheduling of UL transmission, leading to better UL performance.

There are, proposed herein, various embodiments which address one or more of the issues disclosed herein. According to a first embodiment, a wireless device with multiple transmission entities performs a method for reporting power information. The method includes transmitting a plurality of indications of respective power reporting parameters to a base station. Each of the plurality of power reporting parameters corresponds to a respective UTE of the wireless device.

In one aspect of the first embodiment, each of the UTEs includes an antenna panel, a power amplifier, or a combination of hardware that includes an antenna panel and a power amplifier. Moreover, each of the indications of the power reporting parameters may include an indication of the corresponding UTE. According to one embodiment, a mapping of the power reporting parameters to indications of corresponding UTEs may be known only to the wireless device, not the network. An indication of a UTE may be, for example, an index or the like.

In another aspect of the first embodiment, the method further comprises receiving control information that is dependent on at least one of the power reporting parameters. For example, the control information may include a scheduling grant that takes into account one or more power headroom values.

In a further aspect of the first embodiment, the method includes receiving a first set of triggering parameters for triggering reporting of at least one of the plurality of indications of power reporting parameters. Moreover, the method may include receiving a second set of triggering parameters for triggering reporting of at least another one of the plurality of indications of respective power reporting parameters. The triggering parameters may include timing parameters, signal strength thresholds, and the like.

According to another aspect of the first embodiment, the method includes transmitting a plurality of indications of respective maximum carrier power values to the base station. Each of the maximum carrier power values corresponds to a respective UTE of the wireless device. Moreover, at least one of the indications of respective maximum carrier power values may be transmitted to the base station in a power headroom report together with a corresponding at least one of the indications of power headroom values. The power headroom report may further include at least one indication of the at least one UTE corresponding to the respective maximum carrier power values for which at least one indication is transmitted in the power headroom report. Alternatively, at least one of the indications of maximum carrier power values is reported to the base station separately from a corresponding at least one of the indications of power headroom values.

In a further aspect of the first embodiment, the method includes receiving an indication of a first reference signal and/or a first set of power control parameters and obtaining at least one of the power reporting parameters based on the first reference signal and/or the first set of power control parameters. Furthermore, the first reference signal and/or the first set of power control parameters may be indicated by one of: a radio resource control configuration message, or an uplink grant message corresponding to a UTE. According to a further aspect, the uplink grant message is an expired uplink grant message and/or the uplink grant message corresponds to the same UTE for which the at least one power reporting parameter is obtained. Alternatively, the uplink grant message may correspond to a different UTE than the UTE for which the at least one power reporting parameter is obtained. In one aspect of the first embodiment, the indication of the first reference signal and/or first set of power control parameters may include an index.

In another aspect of the first embodiment, the method includes receiving an indication of a second reference signal and/or a second set of power control parameters and obtaining at least another one of the power reporting parameters based on the second reference signal and/or the second set of power control parameters.

According to a second embodiment, a wireless device with multiple transmission entities performs a method for reporting power information. The method includes transmitting a plurality of indications of respective maximum carrier power values to a base station. Each of the plurality of maximum carrier power values corresponds to a respective UTE of the wireless device.

In one aspect of the second embodiment, the method includes receiving control information that is dependent on at least one of the maximum carrier power values. For example, the control information may include a scheduling grant that takes into account one or more maximum carrier power values.

In another aspect of the second embodiment, the method includes transmitting a plurality of indications of respective power headroom values to the base station, each of the power headroom power values corresponding to a respective UTE of the wireless device.

According to a third embodiment, a base station performs a method for receiving power information from a wireless device with multiple transmission entities. The method includes receiving a plurality of indications of power reporting parameters from the wireless device, where each of the plurality of power reporting parameters corresponds to a respective UTE of the wireless device. Aspects of the first embodiment described above are applicable to the third embodiment. For example, according to one aspect of the third embodiment, the method includes transmitting control information that is obtained in dependence on at least one of the power reporting parameters. The control information may be an uplink scheduling grant, for example. Additional aspects of the first embodiment are also applicable to the third embodiment, taking into account that the base station receives the transmissions of the wireless device and vice-versa.

Other embodiments of the present invention include apparatuses corresponding to the above-summarized methods and configured to carry out one or more of these methods, or variants thereof. Thus, embodiments include a wireless device for use in a wireless communication network, the wireless device being adapted to transmit a plurality of indications of respective power reporting parameters to a base station, each of the plurality of power reporting parameters corresponding to a respective UTE of the wireless device. Likewise, other embodiments include a base station adapted to receive a plurality of indications of respective power reporting parameters from a wireless device with multiple UTEs, each of the plurality of power reporting parameters corresponding to a respective UTE of the wireless device. The variations of these techniques as summarized above and as described in further detail below are equally applicable to the method and apparatus embodiments disclosed herein.

BRIEF DESCRIPTION OF THE DRAWINGS

The drawings illustrate selected embodiments of the disclosed subject matter. In the drawings, like reference labels denote like features.

FIGS. 2A-2B have a flowchart illustrating a method of operation a wireless device.

DETAILED DESCRIPTION

Figure 1:
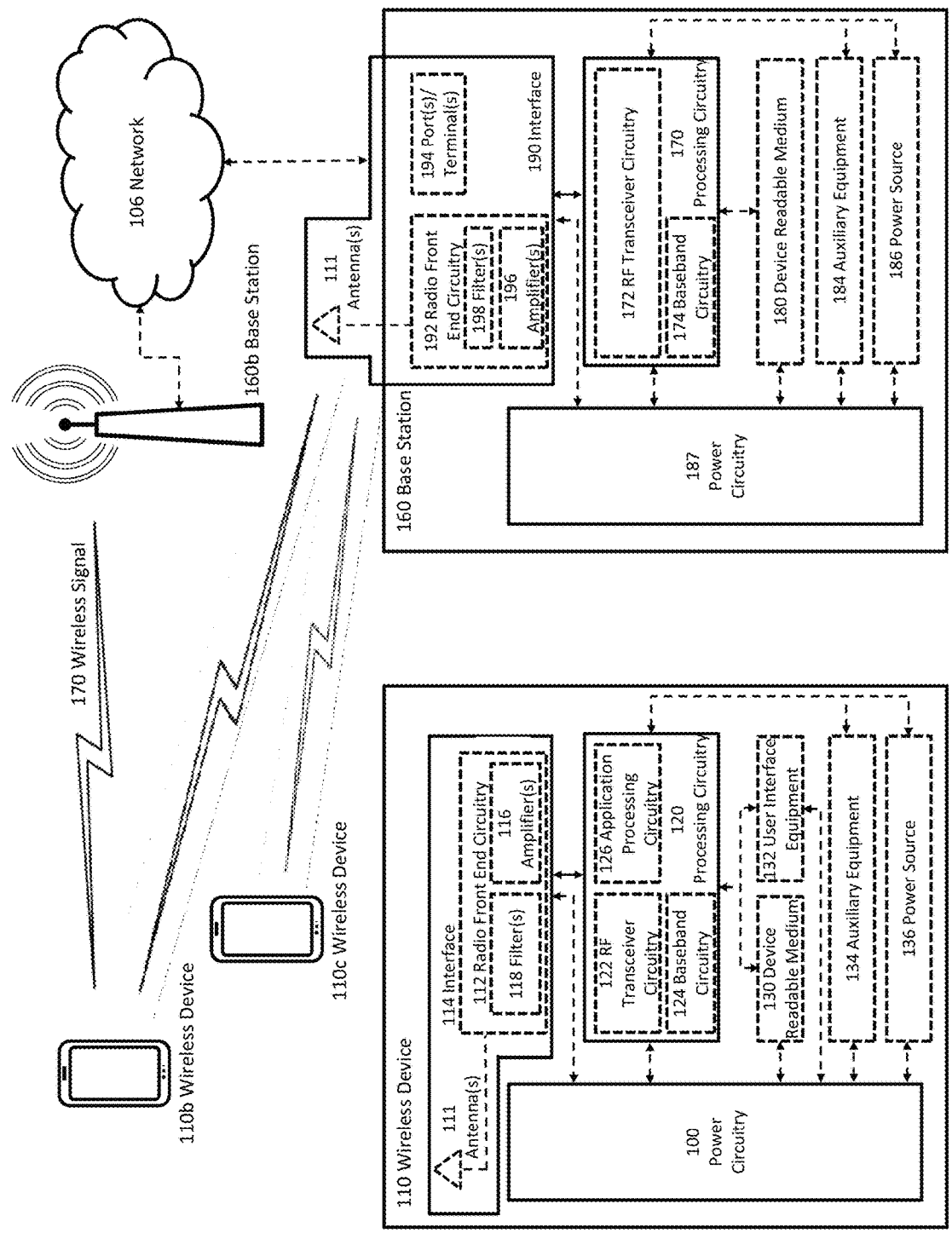
FIG. 1 is a diagram illustrating a wireless communication network that includes one or more wireless devices that communicate with one or more base stations.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In one embodiment, the PHR from the UE includes multiple power headroom (PH) values. Each PH value corresponds to some physical entity at the UE, such as an antenna panel, a power amplifier, or combination of such hardware. Such physical entities are referred to herein as transmission entities or UL transmission entities (UTEs). In certain embodiments, a UTE corresponds to one or more antenna ports. In yet another embodiment different PHRs include PH values corresponding to different UTEs. The PHR may also include information indicating which UTE, or set of UTEs, the PH value, or values, corresponds to.

In some embodiments, the UE will not explicitly reveal how many UTEs or panels it has. Instead, the UE may advertise some abstract quantity that is related to the number of UTEs. This quantity is referred to herein as a UTE indication or indication of a UTE. In certain embodiments, only the UE knows the mapping between a UTE and its hardware resources.

In yet another embodiment the power headroom is reported per UTE.

In a related embodiment, the transmission of a PHR is triggered when the triggering conditions for any of the power headrooms are fulfilled. The triggering conditions may be applied using triggering parameters received from the base station in a configuration message. In another embodiment triggering conditions are applied per UTE, panel or power amplifier in the sense that the triggering conditions and parameters are applied and configured per panel. Hence, for example, there may be a certain threshold in path loss change configured for panel 1, which is used in a PHR triggering condition for panel 1, and yet another threshold configured for panel 2, which is used in a triggering condition for panel 2. In another embodiment there may instead be panel specific timers configured, and applied, to the triggering conditions.

In yet another embodiment where multiple PH values correspond to different panels (although the embodiment is equally applicable to also the case of UTE or power amplifier) there is one reference signal configured, with the intention to be used for path loss estimation, per panel and the PH value corresponding to this panel is obtained using this reference signal. This reference signal may for instance be configured via higher layer configuration or via uplink control information (UCI). In another embodiment the UE is instead configured with a number of RS resource indexes to use for UL power control and a certain one of these indexes may then be used to determine the reference signal to use when obtaining the panel specific PH value. For example, the first RS index, in the set of RS indexes, may be used to obtain or obtain the PH value. In a similar embodiment there is also a configuration per panel on which set of power control parameters to use when obtaining the PH value. The power control parameters may include open-loop power control parameters (e.g., $P_0(j)$ and/or $\alpha(j)$ in equation (1) above) and/or closed-loop power control parameters (e.g., $\delta(l)$ in equation (1) above). In one such embodiment the PH value is obtained using these configurations in absence of an UL grant corresponding to said panel (for instance when an UL grant does not indicate a PUSCH transmission for the said panel).

In yet another embodiment in absence of an UL grant corresponding to said panel, information about the reference signal and/or set of power control parameters to use to obtain the PH value is then obtained via an expired (e.g., previously received or used) UL grant.

In yet another embodiment there is an UL grant corresponding to said panel and information about the reference signal and/or set of power control parameters to use to obtain the PH value is then obtained via the UL grant. In yet another embodiment there is no UL grant corresponding to a given panel and the reference signal and/or set of power control parameters to use is then obtained via an UL grant corresponding to another panel.

In another embodiment, a maximum carrier power value, $P_{CMAX}$ is reported per UTE, panel or power amplifier as part of the PHR or in a separate report. In another embodiment, a base station (or network node) may use the multiple power headroom values in the report to schedule UL transmissions.

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, base stations 160 and 160b, and WDs 110, 110b, and 110c. In practice, a wireless network may further include any additional elements suitable to support communication between wireless devices or between a wireless device and another communication device, such as a landline telephone, a service provider, or any other base station or end device. Of the illustrated components, base station 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Base station 160 and WD 110 comprise various components described in more detail below. These components work together in order to provide base station and/or wireless device functionality, such as providing wireless connections in a wireless network. In different embodiments, the wireless network may comprise any number of wired or wireless networks, base stations, base stations, controllers, wireless devices, relay stations, and/or any other components or systems that may facilitate or participate in the communication of data and/or signals whether via wired or wireless connections.

As used herein, base station refers to equipment capable, configured, arranged and/or operable to communicate directly or indirectly with a wireless device and/or with other base stations or equipment in the wireless network to enable and/or provide wireless access to the wireless device and/or to perform other functions (e.g., administration) in the wireless network. Examples of base stations include, but are not limited to, access points (APs) (e.g., radio access points), radio base stations, Node Bs (e.g., evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A base station may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of base stations include multi-standard radio (MSR) equipment such as MSR BSs, transmission points, or transmission nodes. As another example, a base station may be a virtual network node as described in more detail below. More generally, however, base stations may represent any suitable device (or group of devices) capable, configured, arranged, and/or operable to enable and/or provide a wireless device with access to the wireless network or to provide some service to a wireless device that has accessed the wireless network.

In FIG. 1, base station 160 includes processing circuitry 170, device readable medium 180, interface 190, auxiliary equipment 184, power source 186, power circuitry 187, and antenna 162. Although base station 160 illustrated in the example wireless network of FIG. 1 may represent a device that includes the illustrated combination of hardware components, other embodiments may comprise base stations with different combinations of components. It is to be understood that a base station comprises any suitable combination of hardware and/or software needed to perform the tasks, features, functions and methods disclosed herein. Moreover, while the components of base station 160 are depicted as single boxes located within a larger box, or nested within multiple boxes, in practice, a base station may comprise multiple different physical components that make up a single illustrated component (e.g., device readable medium 180 may comprise multiple separate hard drives as well as multiple RAM modules).

Similarly, base station 160 may be composed of multiple physically separate components (e.g., a NodeB component and a RNC component, or a BTS component and a BSC component, etc.), which may each have their own respective components. In certain scenarios in which base station 160 comprises multiple separate components (e.g., BTS and BSC components), one or more of the separate components may be shared among several base stations. For example, a single RNC may control multiple NodeB's. In such a scenario, each unique NodeB and RNC pair may in some instances be considered a single separate base station. In some embodiments, base station 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Base station 160 may also include multiple sets of the various illustrated components for different wireless technologies integrated into base station 160, such as, for example, GSM, WCDMA, LTE, NR, WiFi, or Bluetooth wireless technologies. These wireless technologies may be integrated into the same or different chip or set of chips and other components within base station 160.

Processing circuitry 170 is configured to perform any determining, calculating, or similar operations (e.g., certain obtaining operations) described herein as being provided by a base station. These operations performed by processing circuitry 170 may include processing information obtained by processing circuitry 170 by, for example, converting the obtained information into other information, comparing the obtained information or converted information to information stored in the base station, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other base station 160 components, such as device readable medium 180, base station 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a base station, network node, or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of base station 160, but are enjoyed by base station 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by base station 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between base station 160, network 106, and/or WDs 110. As illustrated, interface 190 (also called communication circuitry) comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other base stations or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, base station 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from base station 160 and may be connectable to base station 160 through an interface or port.

Antenna 162, interface 190, and/or processing circuitry 170 may be configured to perform any receiving operations and/or certain obtaining operations described herein as being performed by a base station. Any information, data and/or signals may be received from a wireless device, another base station and/or any other network equipment. Similarly, antenna 162, interface 190, and/or processing circuitry 170 may be configured to perform any transmitting operations described herein as being performed by a base station. Any information, data and/or signals may be transmitted to a wireless device, another base station and/or any other network equipment.

Power circuitry 187 may comprise, or be coupled to, power management circuitry and is configured to supply the components of base station 160 with power for performing the functionality described herein. Power circuitry 187 may receive power from power source 186. Power source 186 and/or power circuitry 187 may be configured to provide power to the various components of base station 160 in a form suitable for the respective components (e.g., at a voltage and current level needed for each respective component). Power source 186 may either be included in, or external to, power circuitry 187 and/or base station 160. For example, base station 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of base station 160 may include additional components beyond those shown in FIG. 1 that may be responsible for providing certain aspects of the base station's functionality, including any of the functionality described herein and/or any functionality necessary to support the subject matter described herein. For example, base station 160 may include user interface equipment to allow input of information into base station 160 and to allow output of information from base station 160. This may allow a user to perform diagnostic, maintenance, repair, and other administrative functions for base station 160.

As used herein, wireless device (WD) refers to a device capable, configured, arranged and/or operable to communicate wirelessly with base stations and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a base station. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a base station and/or another WD. In some embodiments, radio front end circuitry and/or antenna 111 may be considered an interface.

As illustrated, interface 114 (also called communication circuitry) comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other base stations or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 2B:
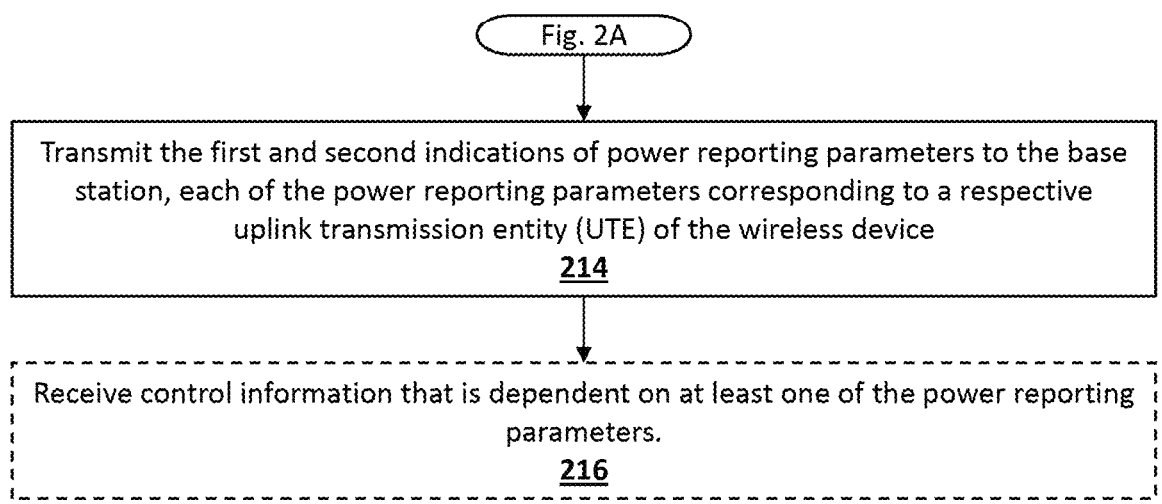

FIG. 2 is a flowchart illustrating an example method 200 of operating a wireless device (e.g., wireless device 110) with multiple UTEs. The method 200 comprises a step 202 in which an indication of a first reference signal and/or a first set of power control parameters is received from a base station. Example reference signals include a CSI-RS signal and a DMRS signal. Example power control parameters include open-loop power control parameters (e.g., $P_0(j)$ and/or $\alpha(j)$ in equation (1) above) and/or closed-loop power control parameters (e.g., $\delta(l)$ in equation (1) above). Then, at step 204, the wireless device obtains at least one of a plurality of power reporting parameters based on the first reference signal and/or the first set of power control parameters. For example, the wireless device may make signal strength measurements using one or both of the first reference signal and the first set of power control parameters. The method further comprises a step 206, in which an indication of a second reference signal and/or a second set of power control parameters is received from a base station, and a step 208, in which the wireless device obtains at least one of a plurality of power reporting parameters based on the second reference signal and/or the second set of power control parameters.

At step 210, the wireless device receives, from the base station, a first set of one or more triggering parameters for triggering reporting of at least a first one of a plurality of indications of the power reporting parameters, where each of the power reporting parameters corresponds to a respective UTE of the wireless device. Similarly, at step 212, the wireless device receives from the base station a second set of one or more triggering parameters for triggering reporting of at least a second one of a plurality of indications of the power reporting parameters, where each of the power reporting parameters corresponds to a respective UTE of the wireless device. The indications of the power reporting parameters may be the parameters themselves or may be a field in a message that indicates or represents the parameter implicitly or explicitly, e.g., using a look-up table, bitmap, or the like.

At step, 214, the wireless device transmits to the base station the first and second indications of power reporting parameters. Each of the UTEs includes an antenna port, an antenna panel, a power amplifier, or a combination of hardware that includes an antenna panel and a power amplifier. In addition, each of the indications of the power reporting parameters may include an indication of the corresponding UTE. In one embodiment, an indication of a maximum carrier power value is transmitted to the base station in a power headroom report together with a corresponding one of the indications of power headroom values. Alternatively, an indication of a maximum carrier power value may be reported to the base station separately from (e.g., in a separate power headroom report) a corresponding one of the indications of power headroom values. The power headroom report may also include an indication of the UTE corresponding to the maximum carrier power value whose indication is transmitted in the power headroom report.

At step 216, the wireless device receives control information that is dependent on at least one of the power reporting parameters. The control information may be or may include a scheduling grant (e.g., an uplink scheduling grant).

In one embodiment of method 200, one or more of steps 202-212 and 216 are omitted, are substituted with alternative steps, or may be combined. For example, in steps 210 and 212 instead of using two separate sets of triggering parameters, a single set of triggering parameters may be used to trigger reporting of both the first and second indications of the power reporting parameters. Moreover, in step 208, the at least another one of the plurality of power reporting parameters may be obtained using the first reference signal and/or the first set of power control parameters of step 204.

Figure 3:
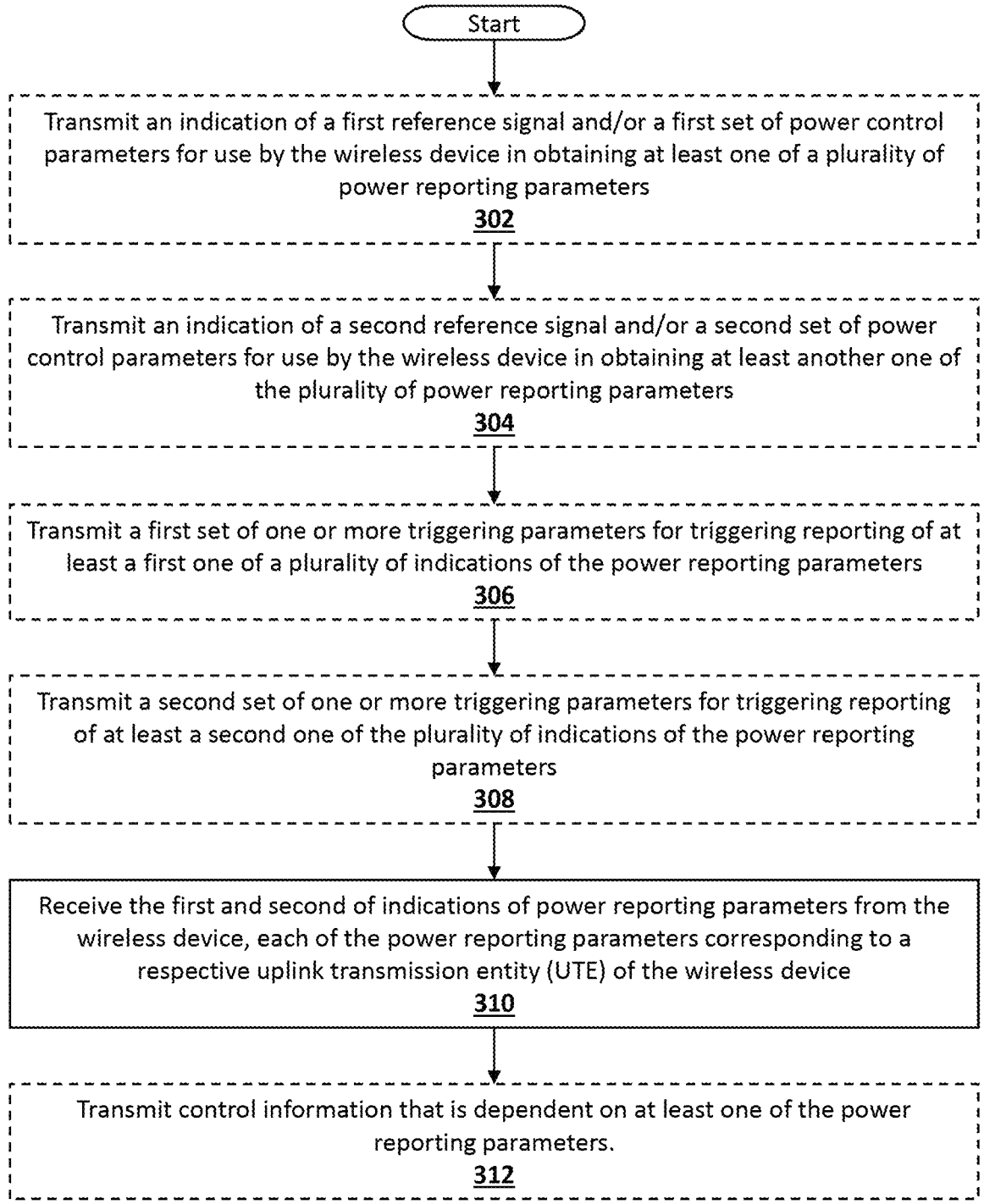
FIG. 3 is a flowchart illustrating a method of operating a base station.

FIG. 3 illustrates another flowchart, this flowchart showing an example method 300, in a base station (e.g., base station 160) of a wireless communication network, of receiving power information from a wireless device with multiple UTEs. As seen at block 302, the illustrated method comprises ttransmitting an indication of a first reference signal and/or a first set of power control parameters for use by the wireless device in obtaining at least one of a plurality of power reporting parameters, where each of the power reporting parameters corresponds to a respective UTE of the wireless device. At step 304, the base station transmits an indication of a second reference signal and/or a second set of power control parameters for use by the wireless device in obtaining at least another one of the plurality of power reporting parameters. Then, at step 306, the base station transmits a first set of one or more triggering parameters for triggering reporting of at least a first one of a plurality of indications of the power reporting parameters. Similarly, at step 308, the base station transmits a second set of one or more triggering parameters for triggering reporting of at least a second one of the plurality of indications of the power reporting parameters.

As seen at step 310, the method 300 further includes receiving the first and second of indications of power reporting parameters from the wireless device. Each of the UTEs includes an antenna port, an antenna panel, a power amplifier, or a combination of hardware that includes an antenna panel and a power amplifier. In addition, each of the indications of the power reporting parameters may include an indication of the corresponding UTE. In one embodiment, an indication of a maximum carrier power value is received from the wireless device in a power headroom report together with a corresponding one of the indications of power headroom values. Alternatively, an indication of a maximum carrier power value may be is received from the wireless device separately from (e.g., in a separate power headroom report) a corresponding one of the indications of power headroom values. The power headroom report may also include an indication of the UTE corresponding to the maximum carrier power value whose indication is received in the power headroom report.

As seen at step 312, the base station transmits control information that is dependent on at least one of the power reporting parameters. The control information may be or may include a scheduling grant (e.g., an uplink scheduling grant).

In one embodiment of method 300, one or more of steps 302-308 and 312 are omitted, are substituted with alternative steps, or may be combined. For example, in steps 306 and 308 instead of transmitting two separate sets of triggering parameters, a single set of triggering parameters may be used to trigger reporting of both the first and second indications of the power reporting parameters. Moreover, in step 304, the at least another one of the plurality of power reporting parameters may be obtained using the first reference signal and/or the first set of power control parameters of step 302.

In one embodiment of methods 200 and 300, the first reference signal and/or the first set of power control parameters is indicated using one or both of a radio resource control configuration message or an uplink grant message corresponding to a UTE. The indication of the first reference signal and/or first set of power control parameters may include an index that references one of a plurality of previously configured reference signals and/or sets of power control parameters. In one embodiment, the uplink grant message is an expired uplink grant message. Moreover, the uplink grant message may correspond to the same UTE for which the at least one power reporting parameter is obtained or may correspond to a different UTE.

Figure 4:
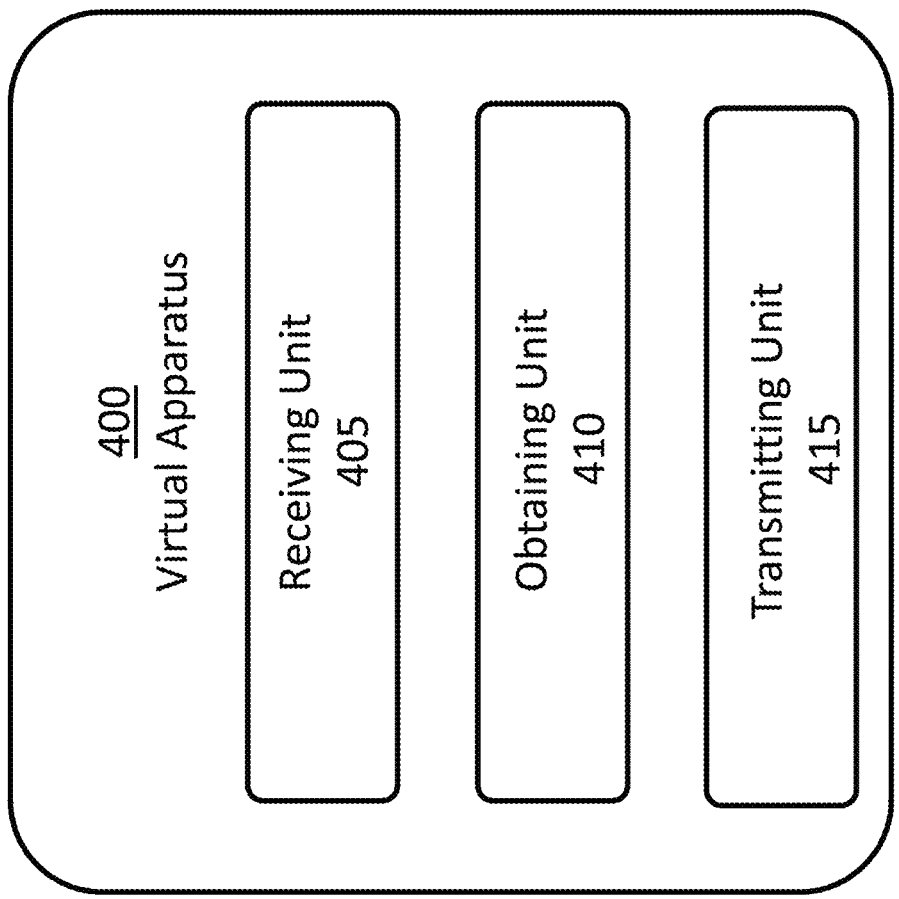
FIG. 4 is a graphical illustration of a virtual wireless device apparatus.

FIG. 4 illustrates a schematic block diagram of an apparatus 400 in a wireless network (for example, the wireless network shown in FIG. 1). The apparatus may be implemented in a wireless device (e.g., wireless device 110 shown in FIG. 1). Apparatus 400 is operable to carry out the example methods described with reference to FIG. 2, and possibly any other processes or methods disclosed herein. It is also to be understood that the method of FIG. 2 is not necessarily carried out solely by apparatus 400. At least some operations of the method can be performed by one or more other entities.

Virtual Apparatus 400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to perform the functionality of a receiving unit 405, an obtaining unit 410, a transmitting unit 415, and any other suitable units of apparatus 400 to perform corresponding functions according to one or more embodiments of the present disclosure. For example, receiving unit 405 may carry out one or more of steps 202, 206, 210, 212, and 216 of method 200; obtaining unit may carry out one or more of steps 204 and 208 of method 200; and transmitting unit 415 may carry out step 214 of method 200.

Figure 5:
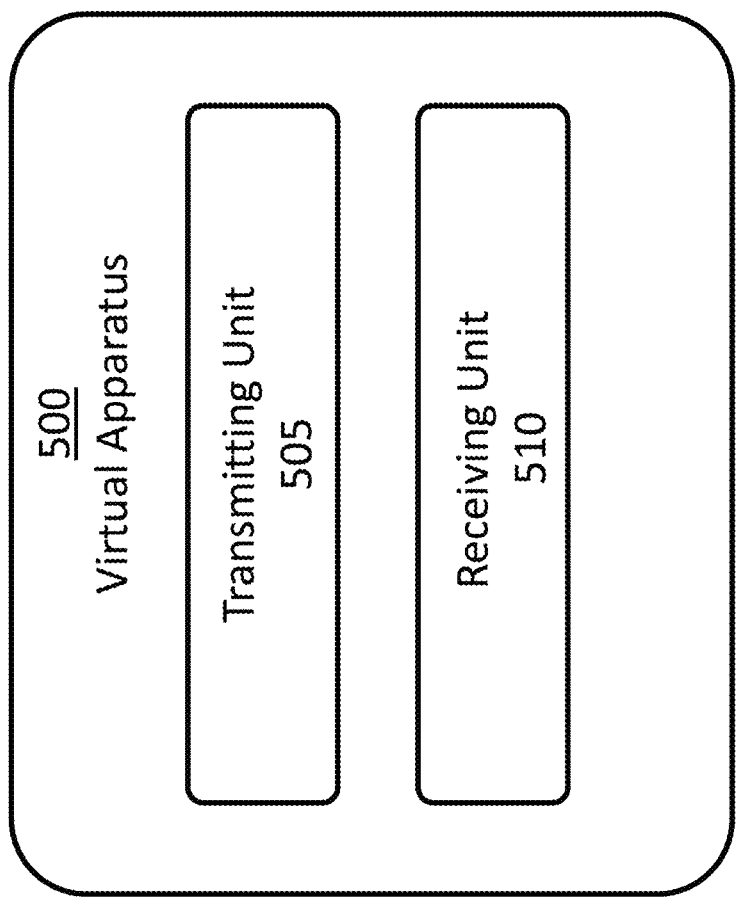
FIG. 5 is a graphical illustration of a virtual base station apparatus.

FIG. 5 illustrates a schematic block diagram of another apparatus 500 in a wireless network (for example, the wireless network shown in FIG. 1). The apparatus may be implemented in a base station (e.g., base station 160 shown in FIG. 1). Apparatus 500 is operable to carry out the example method described with reference to FIG. 3 and possibly any other processes or methods disclosed herein. It is also to be understood that the method of FIG. 3 is not necessarily carried out solely by apparatus 500. At least some operations of the method can be performed by one or more other entities.

Virtual Apparatus 500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to perform the functionality of a transmitting unit 505 and a receiving unit 510, and any other suitable units of apparatus 500 to perform corresponding functions according to one or more embodiments of the present disclosure.

For example, as illustrated in FIG. 5, apparatus 500 includes transmitting unit 505 and receiving unit 510. Transmitting unit 505 is configured to carry out one or more of steps 302, 304, 306, 308, and 312 of method 300; and receiving unit 510 is configured to carry out step 310 of method 300.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 6:
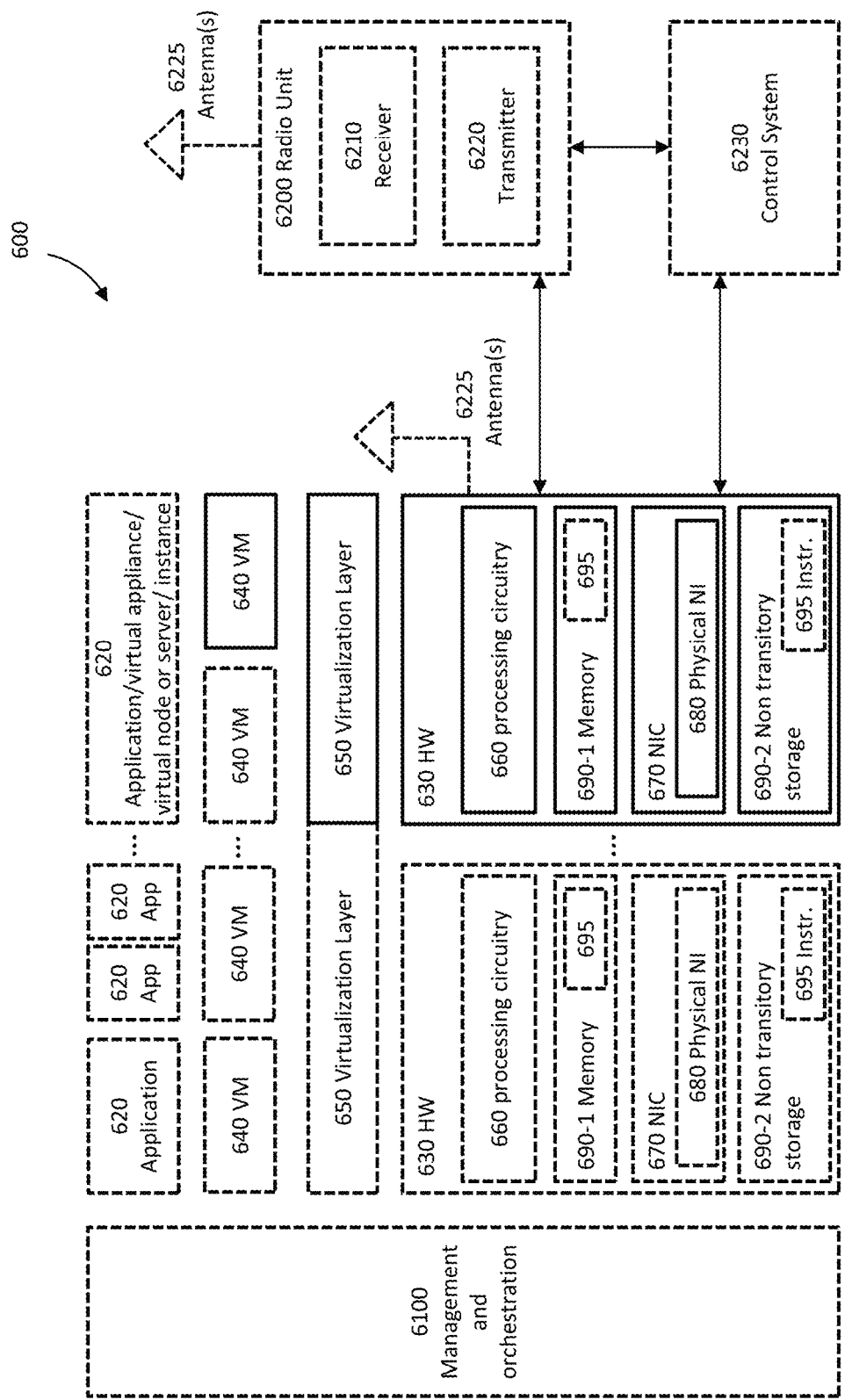
FIG. 6 is a graphical illustration of an example virtualization environment in which embodiments of the invention may operate.

FIG. 6 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 6, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signaling can be effected with the use of control system 6230 which may alternatively be used for communication between the hardware nodes 630 and radio units 6200.

Operation with Remote Host Computers

Figure 7:
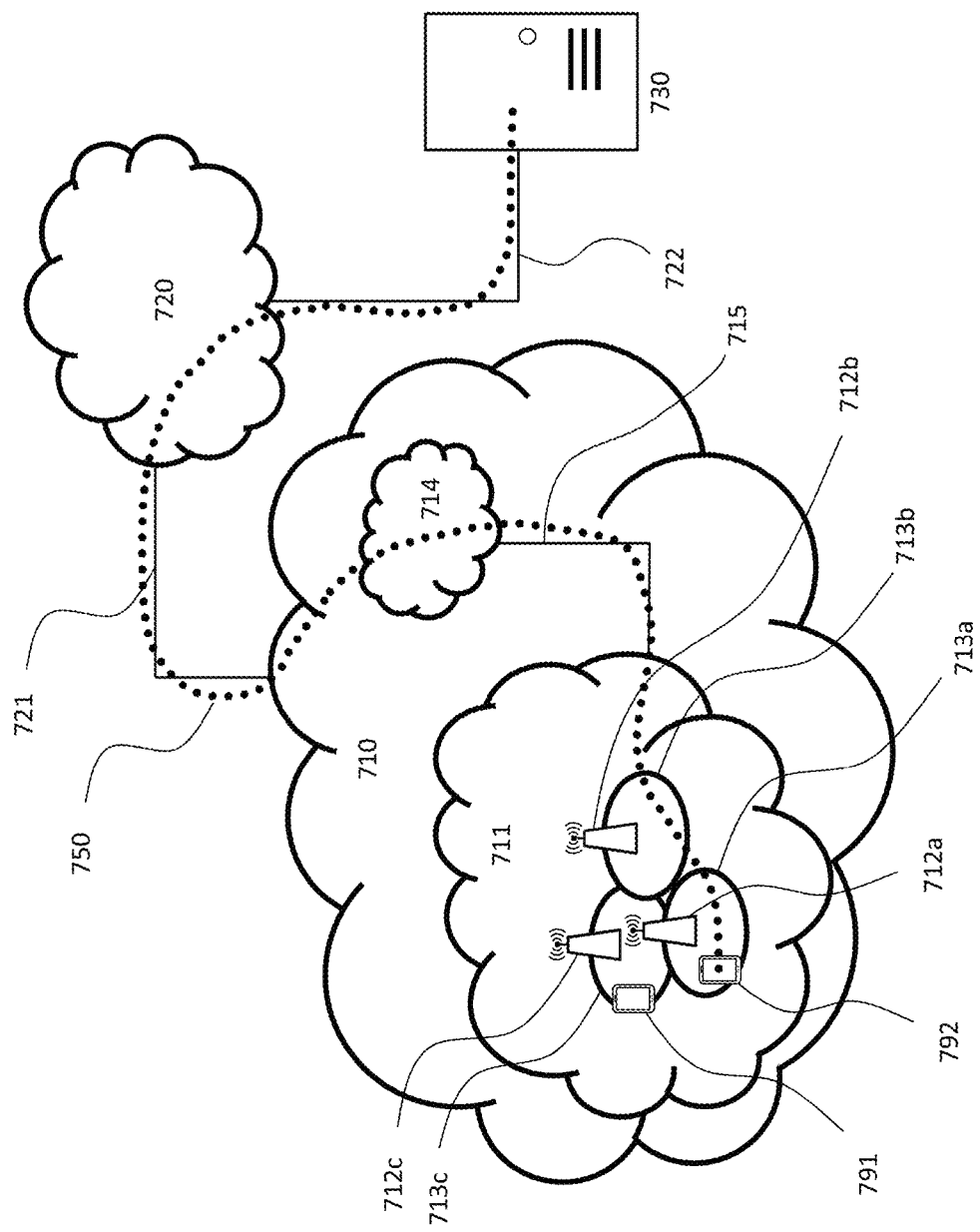
FIG. 7 is a graphical illustration of a telecommunication network connected via an intermediate network to a host computer in accordance with some embodiments.

With reference to FIG. 7, in accordance with an embodiment, a communication system includes telecommunication network 710, such as a 3GPP-type cellular network, which comprises access network 711, such as a radio access network, and core network 714. Access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more sub-networks (not shown).

The communication system of FIG. 7 as a whole enables connectivity between the connected UEs 791, 792 and host computer 730. The connectivity may be described as an over-the-top (OTT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 8) served by base station 820. Communication interface 826 may be configured to facilitate connection 860 to host computer 810. Connection 860 may be direct or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

Figure 8:
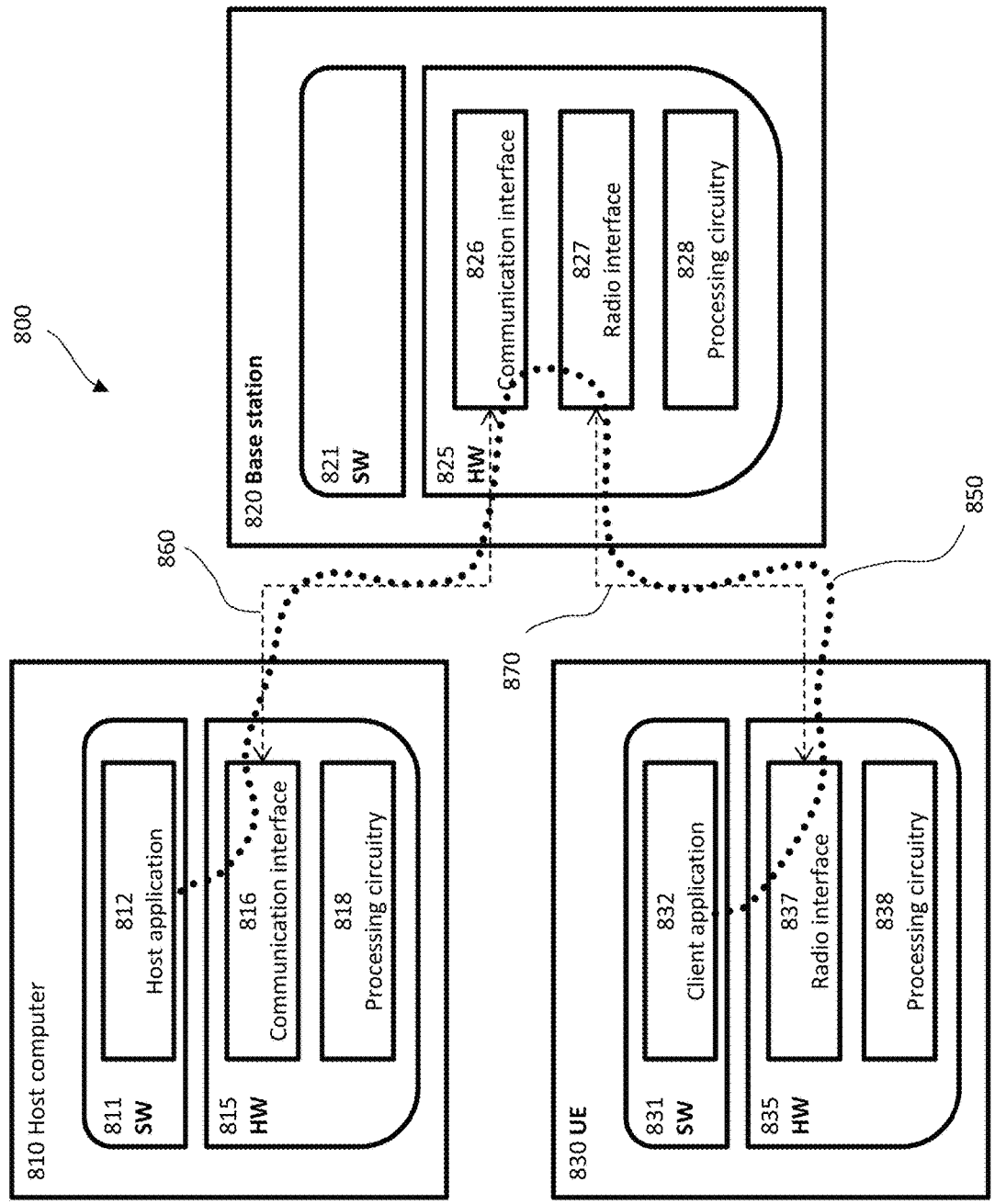
FIG. 8 is a graphical illustration of a host computer communicating via a base station with a user equipment over a partially wireless connection in accordance with some embodiments.

It is noted that host computer 810, base station 820 and UE 830 illustrated in FIG. 8 may be similar or identical to host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may improve the data rate, among other things, and thereby provide benefits such as relaxed restrictions on file size/resolution and better responsiveness.

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above, or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signaling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

Figure 9:
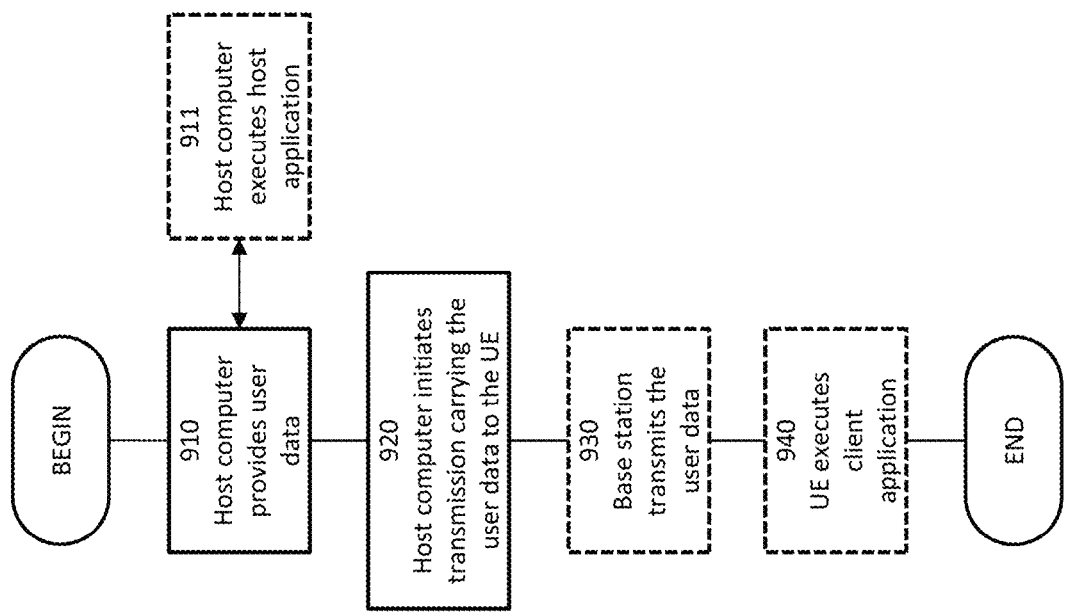
FIG. 9 is a flowchart illustrating a method implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
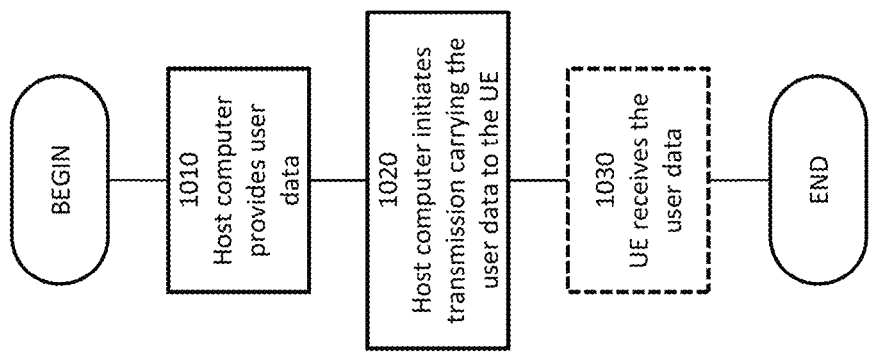
FIG. 10 is a flowchart illustrating a method implemented in a communication system including a host computer and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
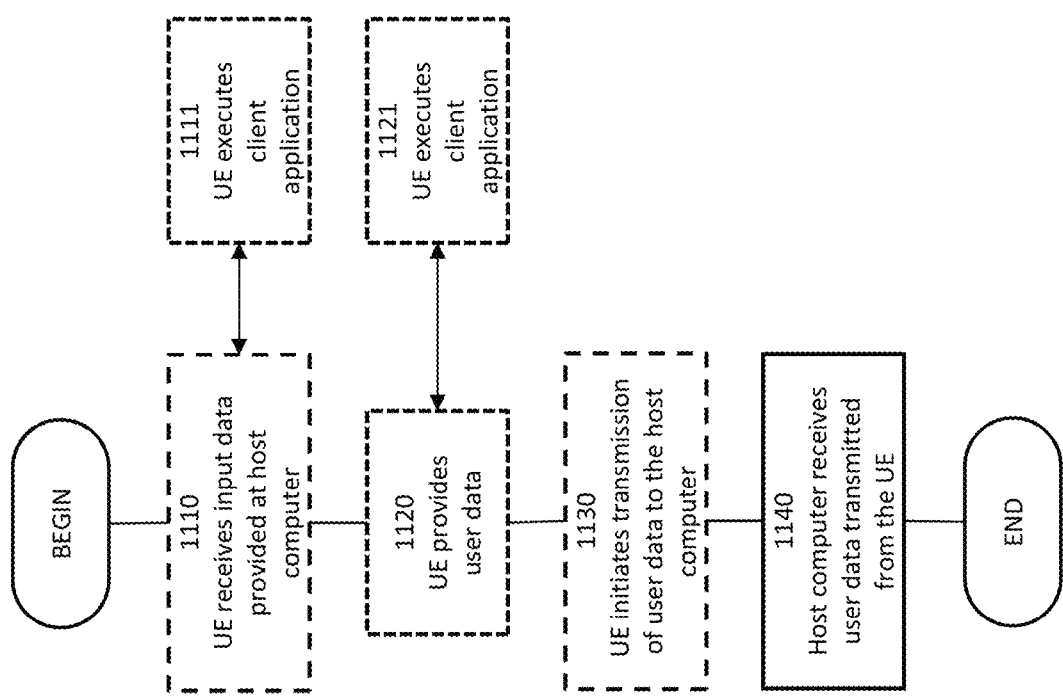
FIG. 11 is a flowchart illustrating another method implemented in a communication system including a host computer and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
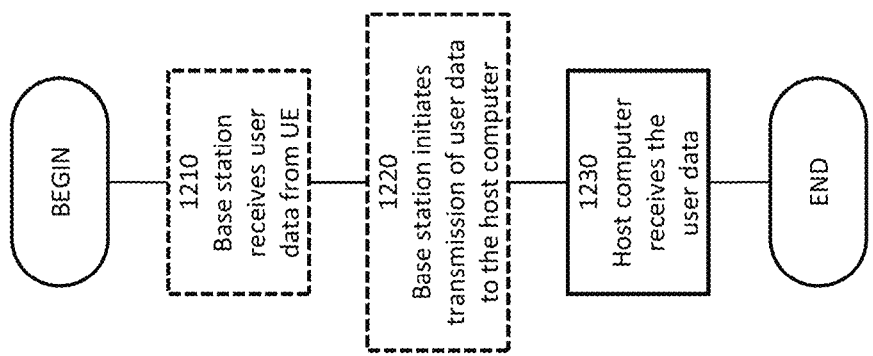
FIG. 12 is a flowchart illustrating another method implemented in a communication system including a host computer, a base station and a user equipment in accordance with some embodiments.
Figure 13:
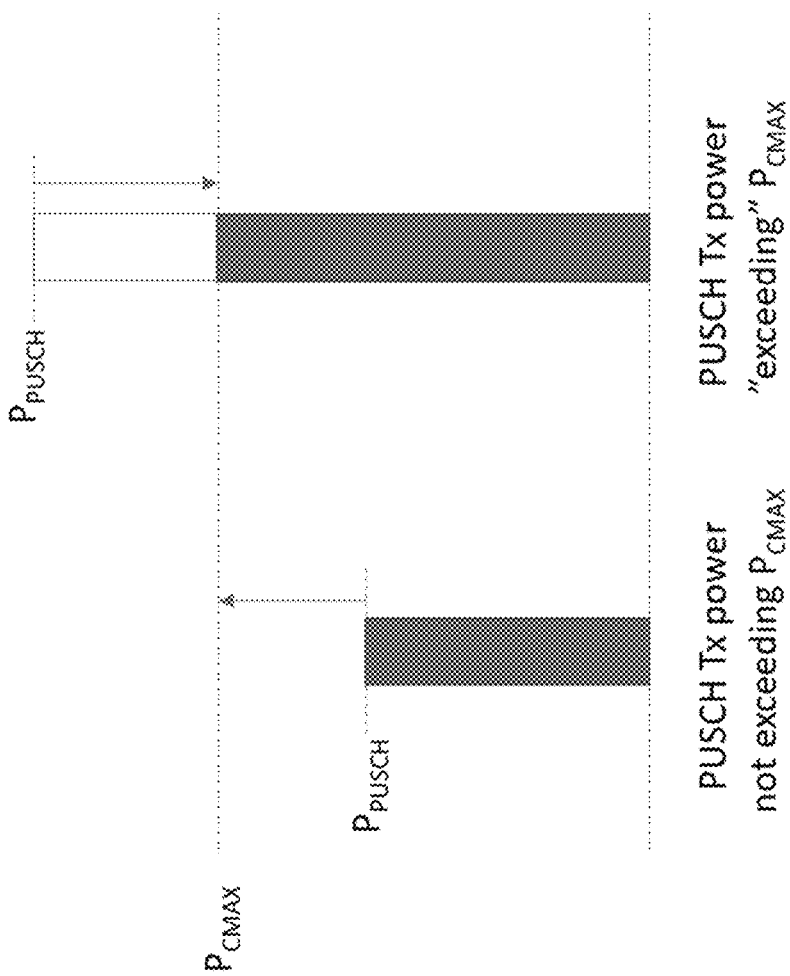
FIG. 13 is a graphical illustration of the concept of power headroom.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

As described above, the exemplary embodiments provide both methods and corresponding apparatuses consisting of various modules providing functionality for performing the steps of the methods. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer-readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

While not being limited thereto, some example embodiments of the presently disclosed techniques and apparatus are provided below.

1. A method for reporting power headroom in a wireless device with multiple transmission entities, the method being performed by the wireless device and comprising:
   transmitting a plurality of indications of respective power headroom values to a base station, each of the plurality of power headroom values corresponding to a respective uplink transmission entity (UTE) of the wireless device.
2. The method of embodiment 1, further comprising receiving control information, wherein the control information is dependent on at least one of the power headroom values.
3. The method of embodiment 2, wherein the control information includes a scheduling grant.
4. The method of any one of the foregoing embodiments, further comprising:
   receiving a first set of one or more triggering parameters for triggering reporting of at least one of the plurality of indications of respective power headroom values.
5. The method of embodiment 4, further comprising:
   receiving a second set of one or more triggering parameters for triggering reporting of at least another one of the plurality of indications of respective power headroom values.
6. The method of any one of the foregoing embodiments, wherein each of the UTEs includes an antenna panel, a power amplifier, or a combination of hardware that includes an antenna panel and a power amplifier.
7. The method of any one of the foregoing embodiments, wherein each of the indications of the power headroom values includes an indication of the corresponding UTE.
8. The method of any one of the foregoing embodiments, further comprising:
   transmitting a plurality of indications of respective maximum carrier power values to the base station, each of the maximum carrier power values corresponding to a respective UTE of the wireless device.
9. The method of embodiment 8,
   wherein at least one of the indications of respective maximum carrier power values is transmitted to the base station in a power headroom report together with a corresponding at least one of the indications of power headroom values.
10. The method of embodiment 9, wherein the power headroom report further includes at least one indication of the at least one UTE corresponding to the respective maximum carrier power values for which at least one indication is transmitted in the power headroom report.
11. The method of embodiment 9, wherein at least one of the indications of maximum carrier power values is reported to the base station separately from a corresponding at least one of the indications of power headroom values.
12. The method of any one of the foregoing embodiments, further comprising:
    receiving an indication of a first reference signal and/or a first set of power control parameters; and
    obtaining at least one of the power headroom values based on the first reference signal and/or the first set of power control parameters.
13. The method of embodiment 12, wherein the first reference signal and/or the first set of power control parameters is indicated by one of:
    a radio resource control configuration message, or
    an uplink grant message corresponding to a UTE.
14. The method of embodiment 12, wherein the indication of the first reference signal and/or first set of power control parameters includes an index.
15. The method of embodiment 12, further comprising:
    receiving an indication of a second reference signal and/or a second set of power control parameters; and
    obtaining at least another one of the power headroom values based on the second reference signal and/or the second set of power control parameters.
16. The method of any one of embodiments 13-15, wherein the uplink grant message is an expired uplink grant message.
17. The method of any one of embodiments 13-16, wherein the uplink grant message corresponds to the same UTE for which the at least one power headroom value is obtained.
18. The method of any one of embodiments 13-16, wherein the uplink grant message corresponds to a different UTE than the UTE for which the at least one power headroom value is obtained.
19. A method for reporting power information in a wireless device with multiple transmission entities, the method being performed by the wireless device and comprising:
    transmitting a plurality of indications of respective maximum carrier power values to a base station, each of the plurality of maximum carrier power values corresponding to a respective UTE of the wireless device.
20. The method of embodiment 19, further comprising receiving control information, wherein the control information is dependent on at least one of the maximum carrier power values.
21. The method of embodiment 20, wherein the control information includes a scheduling grant.
22. The method of any one of embodiments 19-21, wherein each of the UTEs includes an antenna panel, a power amplifier, or a combination of hardware that includes an antenna panel and a power amplifier.
23. The method of any one of embodiments 19-22, wherein each of the indications of the maximum carrier power values includes an indication of the corresponding UTE.
24. The method of any one of embodiments 19-23, further comprising:
    transmitting a plurality of indications of respective power headroom values to the base station, each of the power headroom power values corresponding to a respective UTE of the wireless device.
25. A method for receiving power headroom reports at a base station from a wireless device with multiple transmission entities, the method being performed by the base station and comprising:
    receiving a plurality of indications of respective power headroom values from the wireless device, each of the plurality of power headroom values corresponding to a respective uplink transmission entity (UTE) of the wireless device.
26. The method of embodiment 25, further comprising transmitting control information, wherein the control information is dependent on at least one of the power headroom values.
27. The method of embodiment 26, wherein the control information includes a scheduling grant.

28. The method of any one of embodiments 25-27, further comprising:
   transmitting a first set of one or more triggering parameters for triggering reporting of at least one of the plurality of indications of respective power headroom values.
29. The method of embodiment 28, further comprising:
   transmitting a second set of one or more triggering parameters for triggering reporting of at least another one of the plurality of indications of respective power headroom values.
30. The method of any one of embodiments 25-29, wherein each of the UTEs includes an antenna panel, a power amplifier, or a combination of hardware that includes an antenna panel and a power amplifier.
31. The method of any one of embodiments 25-30, wherein each of the indications of the power headroom values includes an indication of the corresponding UTE.
32. The method of any one of embodiments 25-31, further comprising:
   receiving a plurality of indications of respective maximum carrier power values from the wireless device, each of the maximum carrier power values corresponding to a respective UTE of the wireless device.
33. The method of embodiment 32,
   wherein at least one of the indications of respective maximum carrier power values is received from the wireless device in a power headroom report together with a corresponding at least one of the indications of power headroom values.
34. The method of embodiment 33, wherein the power headroom report further includes at least one indication of the at least one UTE corresponding to the respective maximum carrier power values for which at least one indication is transmitted in the power headroom report.
35. The method of embodiment 33, wherein at least one of the indications of maximum carrier power values is received by the base station separately from a corresponding at least one of the indications of power headroom values.
36. The method of any one of embodiments 25-35, further comprising:
   transmitting an indication of a first reference signal and/or a first set of power control parameters for use by the wireless device in obtaining at least one of the power headroom values.
37. The method of embodiment 36, wherein the first reference signal and/or the first set of power control parameters is indicated by one of:
   a radio resource control configuration message, or
   an uplink grant message corresponding to a UTE.
38. The method of embodiment 36, wherein the indication of the first reference signal and/or first set of power control parameters includes an index.
39. The method of embodiment 36, further comprising:
   transmitting an indication of a second reference signal and/or a second set of power control parameters for use by the wireless device in obtaining at least another one of the power headroom values.
40. The method of any one of embodiments 37-39, wherein the uplink grant message is an expired uplink grant message.
41. The method of any one of embodiments 37-40, wherein the uplink grant message corresponds to the same UTE for which the at least one power headroom value is obtained.
42. The method of any one of embodiments 37-40, wherein the uplink grant message corresponds to a different UTE than the UTE for which the at least one power headroom value is obtained.
43. A method for receiving power information at a base station from a wireless device with multiple transmission entities, the method being performed by the base station and comprising:
   receiving a plurality of indications of respective maximum carrier power values from the wireless device, each of the plurality of maximum carrier power values corresponding to a respective UTE of the wireless device.
44. The method of embodiment 43, further comprising transmitting control information, wherein the control information is dependent on at least one of the maximum carrier power values.
45. The method of embodiment 44, wherein the control information includes a scheduling grant.
46. The method of any one of embodiments 43-45, wherein each of the UTEs includes an antenna panel, a power amplifier, or a combination of hardware that includes an antenna panel and a power amplifier.
47. The method of any one of embodiments 43-46, wherein each of the indications of the maximum carrier power values includes an indication of the corresponding UTE.
48. The method of any one of embodiments 43-47, further comprising:
   receiving a plurality of indications of respective power headroom values from the wireless device, each of the power headroom power values corresponding to a respective UTE of the wireless device.
49. A wireless device for operation in a wireless communication network, the wireless device comprising:
   processing circuitry configured to perform any of the steps of any of embodiments 1-24; and
   communication circuitry configured to transmit/receive transmissions to/from one or more radio access nodes in the wireless communication network.
50. A base station for operation in a wireless communication network, the base station comprising:
   processing circuitry configured to perform any of the steps of any of embodiments 25-48;
   communication circuitry configured to transmit/receive transmissions to/from one or more wireless devices in the wireless communication network.
51. A wireless device for operation in a wireless communication network, the wireless device being adapted to carry out the method of any of embodiments 1-24.
52. A base station for operation in a wireless communication network, the base station being adapted to carry out the method of any of embodiments 25-48.
53. A communication system including a host computer comprising:
   processing circuitry configured to provide user data; and
   a communication interface configured to forward user data to a cellular network for transmission to a wireless device,
   wherein the wireless device comprises a radio interface and processing circuitry, the wireless device's components configured to perform the steps of any one of embodiments 1-24.

54. The communication system of the previous embodiment, wherein the cellular network further includes a base station configured to communicate with the wireless device.
55. The communication system of either of embodiments 53 or 54, wherein:
    the processing circuitry of the host computer is configured to execute a host application, thereby providing the user data; and
    the wireless device's processing circuitry is configured to execute a client application associated with the host application.
56. A method implemented in a communication system including a host computer, a base station, and a wireless device, the method comprising:
    at the host computer, providing user data; and
    at the host computer, initiating a transmission carrying the user data to the wireless device via a cellular network comprising the base station, wherein the wireless device performs any of the steps of any of embodiments 1-24.
57. The method of embodiment 56, further comprising at the wireless device, receiving the user data from the base station.
58. A communication system including a host computer comprising:
    communication interface configured to receive user data originating from a transmission from a wireless device to a base station,
    wherein the wireless device comprises a radio interface and processing circuitry, the wireless device's processing circuitry configured to perform any of the steps of any one of embodiments 1-24.
59. The communication system of embodiment 58, further including the wireless device.
60. The communication system of the previous 2 embodiments, further including the base station, wherein the base station comprises a radio interface configured to communicate with the wireless device and a communication interface configured to forward to the host computer the user data carried by a transmission from the wireless device to the base station.
61. The communication system of any one of embodiments 58-60, wherein:
    the processing circuitry of the host computer is configured to execute a host application; and
    the wireless device's processing circuitry is configured to execute a client application associated with the host application, thereby providing the user data.
62. The communication system of any one of embodiments 58-61, wherein:
    the processing circuitry of the host computer is configured to execute a host application, thereby providing request data; and
    the wireless device's processing circuitry is configured to execute a client application associated with the host application, thereby providing the user data in response to the request data.
63. A method implemented in a communication system including a host computer, a base station and a wireless device, the method comprising:
    at the host computer, receiving user data transmitted to the base station from the wireless device, wherein the wireless device performs any of the steps of any one of embodiments 1-24.
64. The method of the previous embodiment, further comprising, at the wireless device, providing the user data to the base station.
65. The method of ether of embodiments 63 or 64, further comprising:
    at the wireless device, executing a client application, thereby providing the user data to be transmitted; and
    at the host computer, executing a host application associated with the client application.
66. The method of any one of embodiments 63-65, further comprising:
    at the wireless device, executing a client application; and
    at the wireless device, receiving input data to the client application, the input data being provided at the host computer by executing a host application associated with the client application,
    wherein the user data to be transmitted is provided by the client application in response to the input data.
67. A communication system including a host computer comprising a communication interface configured to receive user data originating from a transmission from a wireless device to a base station, wherein the base station comprises a radio interface and processing circuitry, the base station's processing circuitry configured to perform any of the steps of any one of embodiments 1-24.
68. The communication system of the previous embodiment further including the base station.
69. The communication system of either of embodiments 67 or 68, further including the wireless device, wherein the wireless device is configured to communicate with the base station.
70. The communication system of any one of embodiments 67-69, wherein:
    the processing circuitry of the host computer is configured to execute a host application;
    the wireless device is configured to execute a client application associated with the host application, thereby providing the user data to be received by the host computer.
71. A method implemented in a communication system including a host computer, a base station and a wireless device, the method comprising:
    at the host computer, receiving, from the base station, user data originating from a transmission which the base station has received from the wireless device, wherein the wireless device performs any of the steps of any one of embodiments 1-24.
72. The method of embodiment 71, further comprising at the base station, receiving the user data from the wireless device.
73. The method of either of embodiments 71 or 72, further comprising at the base station, initiating a transmission of the received user data to the host computer.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

The disclosed subject matter should not be construed as limited to only the embodiments set forth herein; rather, these embodiments are provided by way of example to convey the scope of the subject matter to those skilled in the art.

The invention claimed is:

1. A method for reporting power information in a wireless device with multiple transmission entities, the method being performed by the wireless device and comprising:
   transmitting a plurality of indications of power reporting parameters to a base station, each of the power reporting parameters corresponding to a particular one of a plurality of uplink transmission entities (UTEs) of the wireless device,
      wherein each of the plurality of UTEs includes an antenna port, an antenna panel, a power amplifier, or a combination of hardware that includes an antenna panel and a power amplifier, and
      wherein the power reporting parameters corresponding to respective UTEs include power headroom values and/or maximum carrier power values.

2. The method of claim 1, further comprising:
   receiving control information, wherein the control information is dependent on at least one of the power reporting parameters.

3. The method of claim 1, further comprising:
   a first set of one or more triggering parameters for triggering reporting of at least one of the plurality of indications of power reporting parameters.

4. The method of claim 1, wherein each of the indications of the power reporting parameters includes an indication of the corresponding UTE.

5. The method of claim 1, wherein at least one of the indications of maximum carrier power values is transmitted to the base station in a power headroom report together with a corresponding at least one of the indications of power headroom values.

6. The method of claim 1, further comprising:
   receiving an indication of a first reference signal and/or a first set of power control parameters; and
   obtaining at least one of the power reporting parameters based on the first reference signal and/or the first set of power control parameters.

7. The method of claim 6, wherein the first reference signal and/or the first set of power control parameters is indicated using one or both of:
   a radio resource control configuration message, or
   an uplink grant message corresponding to a UTE.

8. The method of claim 6, wherein the indication of the first reference signal and/or first set of power control parameters includes an index that references one of a plurality of previously configured reference signals and/or sets of power control parameters.

9. The method of claim 6, further comprising:
   receiving an indication of a second reference signal and/or a second set of power control parameters; and
   obtaining at least another one of the power reporting parameters based on the second reference signal and/or the second set of power control parameters.

10. The method of claim 7, wherein the uplink grant message corresponds to the same or different UTE for which the at least one power reporting parameter is obtained.

11. A method for receiving power information at a base station from a wireless device with multiple transmission entities, the method being performed by the base station and comprising:
   receiving a plurality of indications of power reporting parameters from the wireless device, each of the power reporting parameters corresponding to a particular one of a plurality of uplink transmission entities (UTEs) of the wireless device,
      wherein each of the plurality of UTEs includes an antenna port, an antenna panel, a power amplifier, or a combination of hardware that includes an antenna panel and a power amplifier, and
      wherein the power reporting parameters corresponding to respective UTEs include power headroom values and/or maximum carrier power values.

12. The method of claim 11, further comprising:
   transmitting control information, wherein the control information is dependent on at least one of the power reporting parameters.

13. The method of claim 11, further comprising:
   transmitting a first set of one or more triggering parameters for triggering reporting of at least one of the plurality of indications of power reporting parameters.

14. The method of claim 11, wherein each of the indications of the power reporting parameters includes an indication of the corresponding UTE.

15. The method of claim 11, wherein at least one of the indications of maximum carrier power values is received from the wireless device in a power headroom report together with a corresponding at least one of the indications of power headroom values.

16. The method of claim 15, wherein at least one of the indications of maximum carrier power values is received by the base station separately from a corresponding at least one of the indications of power headroom values.

17. The method of claim 11, further comprising:
   transmitting an indication of a first reference signal and/or a first set of power control parameters for use by the wireless device in obtaining at least one of the power reporting parameters.

18. The method of claim 17, wherein the first reference signal and/or the first set of power control parameters is indicated using one or both of:
   a radio resource control configuration message, or
   an uplink grant message corresponding to a UTE.

19. The method of claim 17, further comprising:
   transmitting an indication of a second reference signal and/or a second set of power control parameters for use by the wireless device in obtaining at least another one of the power reporting parameters.

20. The method of claim 18, wherein the uplink grant message corresponds to the same or different UTE for which the at least one power reporting parameter is obtained.

21. A wireless device for operation in a wireless communication network, the wireless device comprising:
   processing circuitry configured to:
   transmit a plurality of indications of power reporting parameters to a base station, each of the power reporting parameters corresponding to a particular one of a plurality of uplink transmission entities (UTEs) of the wireless device,
      wherein each of the plurality of UTEs includes an antenna port, an antenna panel, a power amplifier, or a combination of hardware that includes an antenna panel and a power amplifier, and wherein the power reporting parameters correspond to respective UTEs include power headroom values and/or maximum carrier power values; and communication circuitry configured to transmit/receive transmissions to/from one or more base stations in the wireless communication network.

22. A base station for operation in a wireless communication network, the base station comprising:
processing circuitry configured to:
receive a plurality of indications of power reporting parameters from a wireless device, each of the power reporting parameters corresponding to a particular one of a plurality of uplink transmission entities (UTEs) of the wireless device, the power reporting parameters corresponding to respective UTEs include power headroom values and/or maximum carrier power values, wherein each of the plurality of UTEs includes an antenna port, an antenna panel, a power amplifier, or a combination of hardware that includes an antenna panel and a power amplifier; and
communication circuitry configured to transmit/receive transmissions to/from the wireless devices.

* * * * *